United States Patent [19]

Schwirian

[11] Patent Number: 6,055,288
[45] Date of Patent: Apr. 25, 2000

[54] NUCLEAR REACTOR VESSEL

[75] Inventor: Richard E. Schwirian, Pittsburgh, Pa.

[73] Assignee: Westinghouse Electric Company, Pittsburgh, Pa.

[21] Appl. No.: 09/122,288

[22] Filed: Jul. 24, 1998

Related U.S. Application Data

[60] Provisional application No. 60/054,529, Aug. 4, 1997.

[51] Int. Cl.[7] ................................................... G21C 15/10
[52] U.S. Cl. ............................................................ 376/302
[58] Field of Search ................................... 376/277, 287, 376/302, 399, 400

[56] References Cited

U.S. PATENT DOCUMENTS

| | | | |
|---|---|---|---|
| 4,069,102 | 1/1978 | Berringer et al. | 376/302 |
| 5,771,266 | 6/1998 | Fabris | 376/302 |

*Primary Examiner*—Daniel D. Wasil

[57] ABSTRACT

A nuclear reactor vessel has a baffle-barrel assembly for supporting the fuel assemblies in its core region and guiding coolant flowing through the core region when the reactor vessel is in service. The baffle assembly includes a baffle plate fastened to a former plate by a bolt. The baffle plate has a countersunk hole extending to a smaller diameter baffle plate hole. The former plate has a bolt hole aligned with the baffle plate hole. The bolt has a head portion disposed in the countersunk hole and a shank extending from the undersurface of the head portion into the aligned bolt holes and threadedly engaged with the former plate. A hole or slot extending through or along the bolt head and externally of the shank is formed in the bolt head itself or between the bolt head and the baffle plate for flowing coolant past the undersurface of the bolt head and the crevice it forms with the baffle plate so that steam which may form under the bolt head will be readily vented, deposited particulates from stagnant coolant and precipitates from the steam will be washed from the underside of the bolt head and the adjacent crevice, and the bolt head will be cooled. Because the shank does not have an axial bore or other passageway for coolant flow, the shank can be readily untrasonically tested and its strength is not compromised.

Operational reactor vessels may be backfit without having to remove and disassemble the baffle assemblies.

14 Claims, 4 Drawing Sheets

NUCLEAR REACTOR VESSEL

CROSS REFERENCE TO RELATED APPLICATIONS

This application claims the benefit of U.S. Provisional Application Ser. No. 60/054,529 Filed Aug. 4, 1997.

BACKGROUND OF THE INVENTION

The invention relates to a nuclear reactor vessel and more particularly to a nuclear reactor adapted to reduce the rate of degradation of structural members in its core region.

A pressurized water nuclear reactor vessel in a commercial electric power generating plant recirculates an aqueous solution generally known as the "primary coolant" (principally containing small variable amounts of boric acid and lithium hydroxide and substantially saturated with hydrogen) through the reactor core region of the vessel at temperatures of up to about 500° F. or more and at pressures of up to about 2250 psi or more. The principal function of the primary water is to transfer heat generated by fuel assemblies in the reactor core region to one or more near-by heat exchangers for generating steam to drive turbines and thereby generating electric power. In a commercial boiling water reactor, the steam is generated in the reactor vessel itself. In other reactor designs, the core region may be cooled by liquid sodium or by gaseous coolants instead of aqueous solutions. The primary coolant also cools the internal structural members in the high temperature irradiated core region of the reactor vessels containing the fuel assemblies.

Recent ultrasonic inspections in commercial pressurized water reactors outside of the United States have indicated that the baffle/former bolts which conventionally fasten internal baffle plates (which support the fuel assemblies and guide the primary coolant through the core region) with internal former plates (which maintain the baffle plates in place in the reactor vessel cores) may be susceptible to cracking. Contemporaneous inspections of "up flow" pressurized water reactors having water (i.e., primary coolant) cooled joint designs including vertically oriented flow holes machined through the former plates, which holes interconnect with the bolt holes like those shown in U.S. Pat. No. 4,069,102, did not indicate any degradation of their baffle/former bolts. Periodic inspections of existing baffle/former bolts in commercial "down flow" commercial reactors in the United States have not indicated significant degradation which would require the nuclear power industry to replace the bolts or otherwise backfit such reactors.

Now, the nuclear power industry is considering the desirability of backfitting operating reactors in order to better cool the baffle/former bolts and thereby to provide an additional temperature margin in order to reduce their susceptibility to cracking. However, a backfit of an existing nuclear reactor vessel along the lines of the teaching of U.S. Pat. No. 4,069,102 will be very difficult because the former plates are physically located behind the baffle plates and therefore are inaccessible. Such a backfit will require either that radially directed flow holes be machined into the bolt holes of former plates from the baffle side while the vessel internals remain assembled in a submerged reactor vessel, or alternatively that the internals be removed from the reactor vessel, disassembled, and the former plates then machined remotely from the reactor vessel. Both of these backfit methods are very difficult, costly, time-consuming processes. In addition, the cost of providing replacement power will be high. Alternatively, replacement of the existing reactor internals would be very costly, although not as time-consuming.

U.S. Pat. No. 4,069,102 also proposes a bolt design having an internal bore extending down the centerline of the bolt shaft for cooling the bolt. However, such bores make the bolts difficult to ultrasonically inspect and may significantly affect the strength of the bolt.

SUMMARY OF THE INVENTION

It is an object of the present invention to provide an improved reactor vessel design having an improved baffle/former joint which provides effective cooling of the baffle/former bolts.

In addition, the inventor has found that the baffle plate/former plate joint design of U.S. Pat. No. 4,069,102 makes it possible under some operating conditions for impurities to buildup and precipitates and particulates to deposit in the annulus of the baffle plates under the bolt heads. The build-up of particulates and precipitates under the bolt heads may then cause the temperature of the bolt heads to rise and may even cover the crevices formed by the bolt heads with the baffle plates, which can accelerate degradation due to stress corrosion cracking or to crevice corrosion.

Thus, it is a further object of the present invention to provide a design which effectively washes the undersurfaces of the bolt heads to reduce the local concentrations of dissolved and/or particulate chemicals or materials.

With these objects in view, the present invention resides in a nuclear reactor vessel having a baffle-barrel assembly for supporting fuel assemblies in a core region and for guiding a fluid flowing through the core region when the vessel is in service during power operation. The baffle-barrel assembly includes: a baffle plate having a countersunk hole with a relatively large diameter and a smaller diameter baffle plate bolt hole extending from the countersunk hole; a former plate having a bolt hole aligned with the baffle plate hole; and a bolt fastening the two plates together. The bolt has a head portion with an undersurface disposed in the countersunk hole and a shank extending from the underside of the head portion into the aligned bolt holes. The bolt head portion defines at least in part a fluid flow passageway extending externally of the shank interconnecting the countersunk hole with the baffle plate bolt hole. Advantageously, such a bolt can be readily ultrasonically tested and its strength is not compromised by a passageway through the shaft. Also, when the pressure vessel is in service, primary coolant fluid can flow through the short passageway and thereby cool the bolt head. Importantly, the coolant fluid also washes the region under the bolt head so that precipitates will not be deposited and trapped at the crevice formed by the underside of the bolt head portion and the baffle plate as a result of the generation of steam or of the accumulation of other solid particulates from temporarily trapped fluids during startup, power or shutdown operations.

In addition, existing nuclear reactor vessels may be readily backfitted in accordance with the present invention by: removing the nuclear reactor vessel from service; and then replacing one or more of the existing baffle plate/former plate bolts described above each with a baffle plate/former plate bolt having a head portion defining at least in part a fluid flow passageway external of the shaft. Then, the primary coolant flowing through the reactor vessel may wash the underside of the replacement bolt heads when the reactor vessel is returned to service.

BRIEF DESCRIPTION OF THE DRAWINGS

The invention as set forth in the claims will become more apparent from the following detailed description of the following preferred embodiments thereof shown, by way of example only, in the accompanying drawings, wherein:

DESCRIPTION OF THE PREFERRED EMBODIMENT

Figure 1:
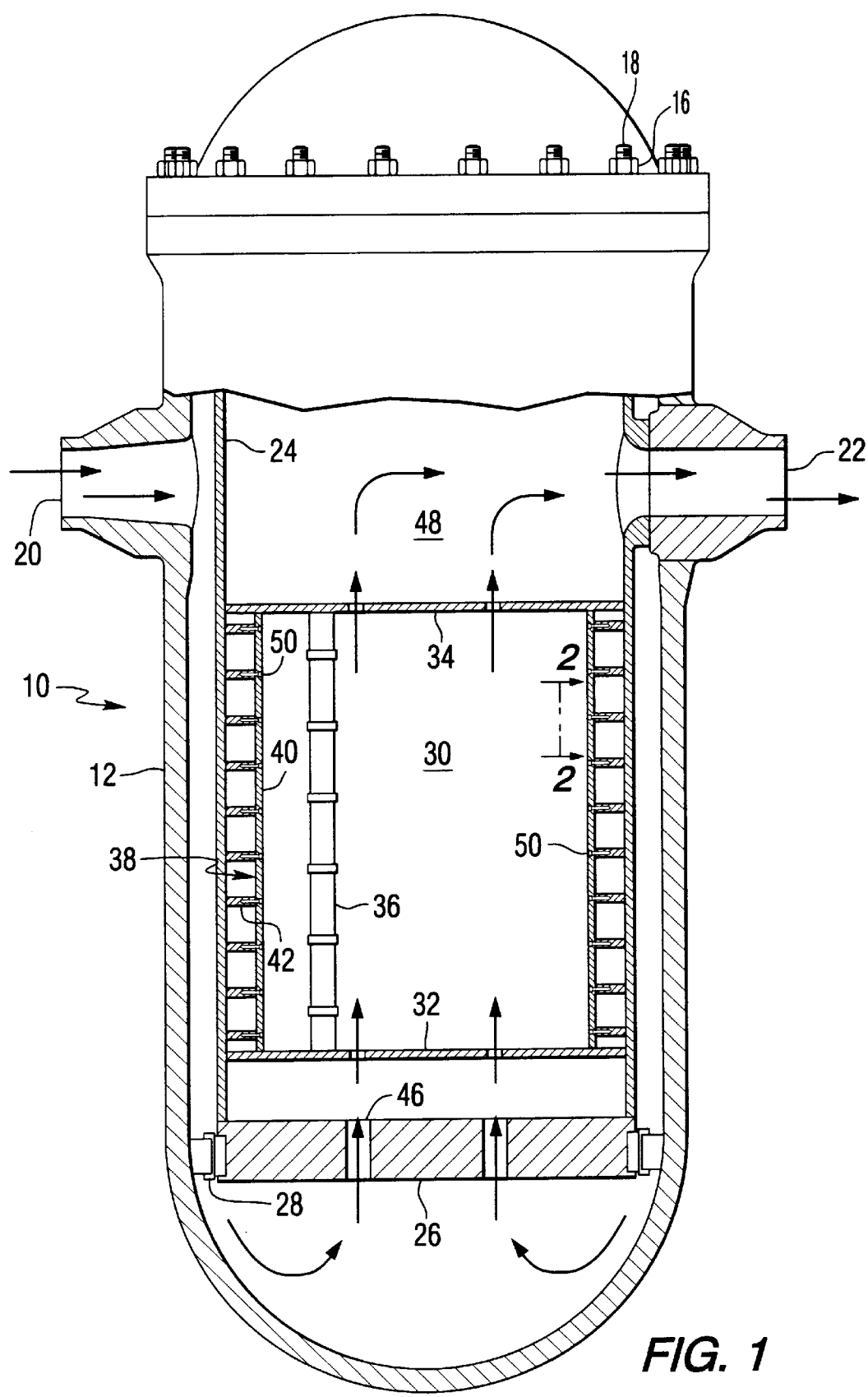
FIG. 1 is a schematic representation of a nuclear reactor vessel partially sectioned to illustrate the general structure of the core region.

Referring now to the drawings in detail and in particular to FIG. 1 there is shown a conventional nuclear reactor vessel 10 which may be employed in commercial pressurized water reactors for commercial electric power generation. The reactor vessel 10 generally has a vessel shell 12 with a removable head 14 fastened thereto by a plurality of nuts 16 on studs 18. The vessel shell 12 has at least one reactor inlet nozzle 20 and at least one reactor outlet nozzle 22 in fluid flow communication with a nearby steam generator (not shown). In commercial electric power generating plants, a reactor vessel 10 will normally be coupled with two, three or four steam generators and receive primary coolant from reactor coolant pumps associated with the steam generators. Thus, there will normally be one inlet nozzle 20 and one outlet nozzle 22 for each steam generator. A core barrel 24 is suspended from an internal ledge (not shown) and is radially supported at a lower support plate 26 by radial supports 28 attached to the reactor vessel shell 12. The core barrel 24 supports a plurality of fuel assemblies (illustrated by fuel assembly 36) in a core region 30 which is generally defined by a lower core plate 32 and an upper core plate 34. The core region 30 may support up to 150 or more fuel assemblies surrounded and supported by a baffle assembly 38 including a substantially vertical baffle plate 40 (which may be comprised of a plurality of smaller plates which are welded or bolted together) fastened to generally horizontal former plates 42 by baffle plate/former plate bolts 50. Bolts 50 are shown in FIG. 1 as protruding into the core region 30 for purposes of illustration but Generally do not protrude as shown in commercial reactor vessels 10. The former plates 42 may be welded or bolted to the core barrel 24.

The primary coolant fluid flows into the reactor vessel 10 from a reactor coolant pump (not shown) through the reactor vessel inlet 20, downwardly through an annulus know as a "downcomer" between the reactor vessel shell 12 and the core barrel 24, upwardly through holes 46 in the lower plate 26, through the core region 30 into an upper plenum 48, and out through reactor vessel outlet 22 to a steam generator (not shown) and then back to the reactor coolant pump. The principal functions of the recirculating coolant fluid are to absorb heat generated by the fuel assemblies 36 and to cool the reactor vessel 10 and its internal structure.

Figure 2:
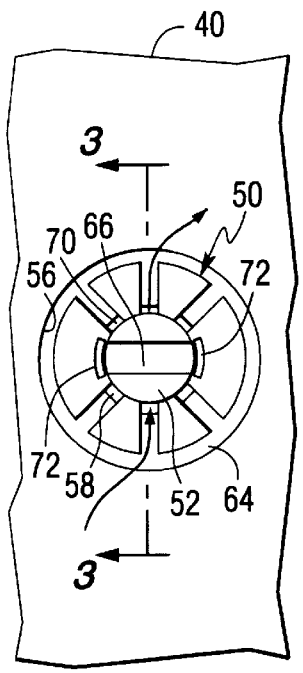
FIG. 2 is a partial view of a baffle plate shown in FIG. 1 taken along Line 2—2 illustrating a baffle/former bolt fastened thereto in accordance with the present invention.
Figure 3:
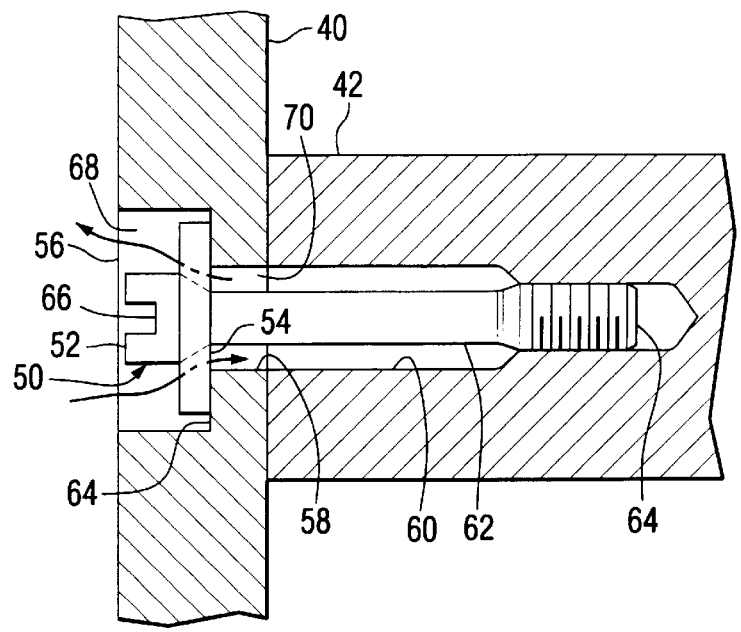
FIG. 3 is a cross section of the baffle/former bolt assembly of FIG. 2 taken along Line 3—3.
Figure 4:
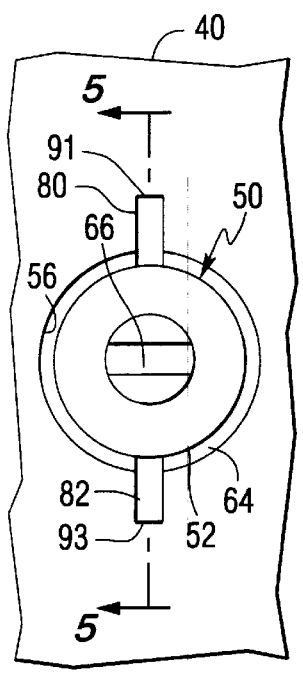
FIG. 4 is a partial view of a baffle plate shown in FIG. 1 similar to the view shown in FIG. 2—2 but illustrating a baffle/former bolt fastened thereto in accordance with a second embodiment of the present invention.
Figure 5:
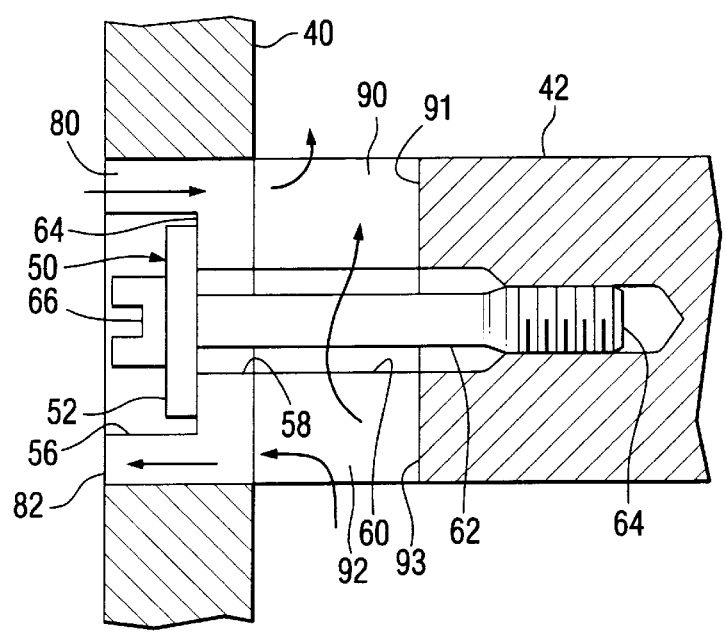
FIG. 5 is a cross section of the baffle/former bolt assembly shown in FIG. 4 taken along Line 5—5.
Figure 6:
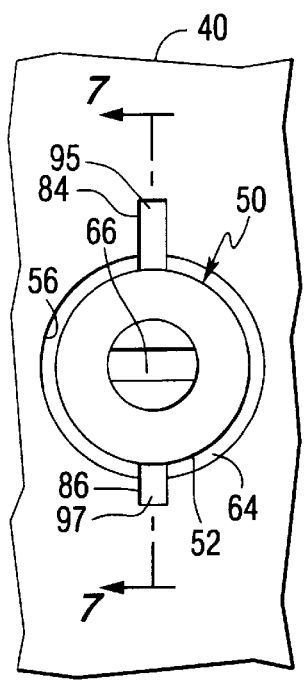
FIG. 6 is a partial view of a baffle plate shown in FIG. 1 similar to the view shown in FIG. 2—2 but illustrating a baffle/former bolt fastened thereto in accordance with a third embodiment of the present invention.
Figure 7:
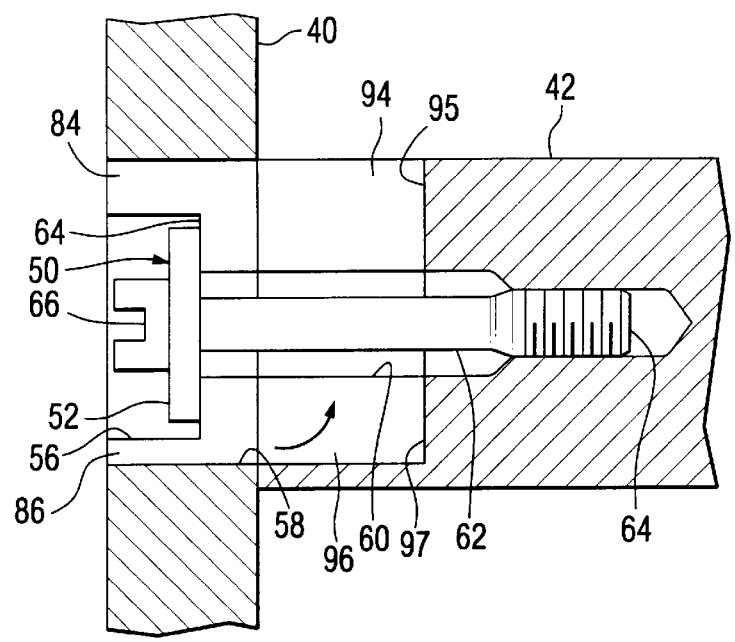
FIG. 7 is a cross section of the baffle/former bolt assembly shown in FIG. 6 taken along Line 7—7.

FIGS. 2 and 3 illustrate a baffle plate 40/former plate 42 joint design having a modified baffle/former bolt 50 which permits the primary coolant to flow past a modified bolt head portion 52 to cool the bolt 50 and to wash the undersurface 54 of the bolt head portion 52. The undersurface 54 may be the underside of a flanged section of the head portion 52 (as is shown and is preferable) or may be the undersurface of an unflanged head (as shown in U.S. Pat. No. 4,069,102, although not shown herein) or the undersurface of a separate washer (not shown). The baffle plate 40 has a countersunk hole 56 having a diameter extending to a smaller diameter bolt hole 58, and the former plate 42 has a bolt hole 60 aligned with the baffle plate hole 58. The bolt 50 has a shank 62 extending from the undersurface 54 of the bolt head portion 52 into the aligned bolt holes 58,60 to a threaded distal end 64 which threadedly engages the former plate 42. When the baffle assembly 38 is fastened together, the underside 54 of the bolt head portion 52 seats against countersunk surface 64 of the baffle plate 40 and forms a crevice therewith. The bolt head portion 52 has one or more spaced apart peripheral slots 68 which, together with the baffle plate countersunk surface 64, defines fluid flow passageways such as orifices 70 between the countersunk hole 56 and the baffle plate bolt hole 58. The orifices 70 may be sized to permit the primary coolant to flow into and out of the bolt hole 58 and past the bolt head portion underside 54 so that any steam which may form will be vented, any solids which may tend to deposit near the crevice under the bolt head portions 52 will be washed away and the undersurface 54 of the bolt head portion 52 will be cooled. Alternatively and/or additionally, the fluid flow passageways may be formed by one or more holes through the head portion 52 externally of the shank 62 as illustrated by holes 72.

FIGS. 4–9 illustrate other embodiments of the present invention where one or more fluid flow passageways may be machined into the baffle plate 40 and the former plate 42 while the baffle assembly 38 is assembled in the reactor vessel. FIGS. 4–7 illustrate embodiments of the present invention wherein two slots 80,82 and 84,86 are machined into the baffle plate 40 by any suitable means such as electro-machining. The slots 80,82 have the same cross-sectional areas whereas slots 84,86 have different cross-sectional areas for providing different flow rates. The slots 80,82 and slots 84,86 extend to slots 90, 92 and 94,96 (having far sides 91, 93 and 95, 97, respectively) in the former plate 42, which permits the primary coolant to flow from one side of the baffle plate to the other side. These slots are sized, positioned and designed to prevent excessively high hydraulic forces of the flowing primary coolant from impinging upon the adjacent fuel assemblies 36.

Advantageously, the slots 90,92 and 94,96 may be cut very narrowly and substantially as long as the shank 62 for cooling the bolts 50.

Figure 8:
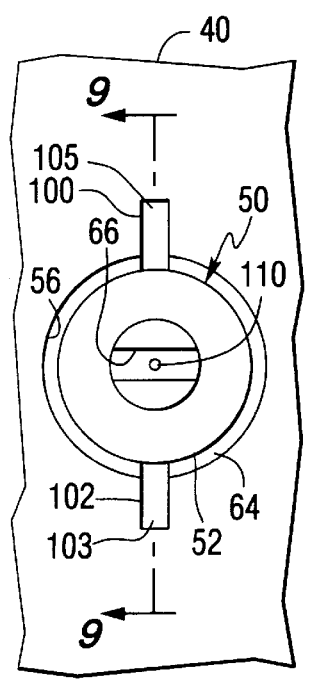
FIG. 8 is a partial view of a baffle plate shown in FIG. 1 similar to the view shown in FIG. 2—2 but illustrating a baffle/former bolt fastened thereto in accordance with a fourth embodiment of the present invention.
Figure 9:
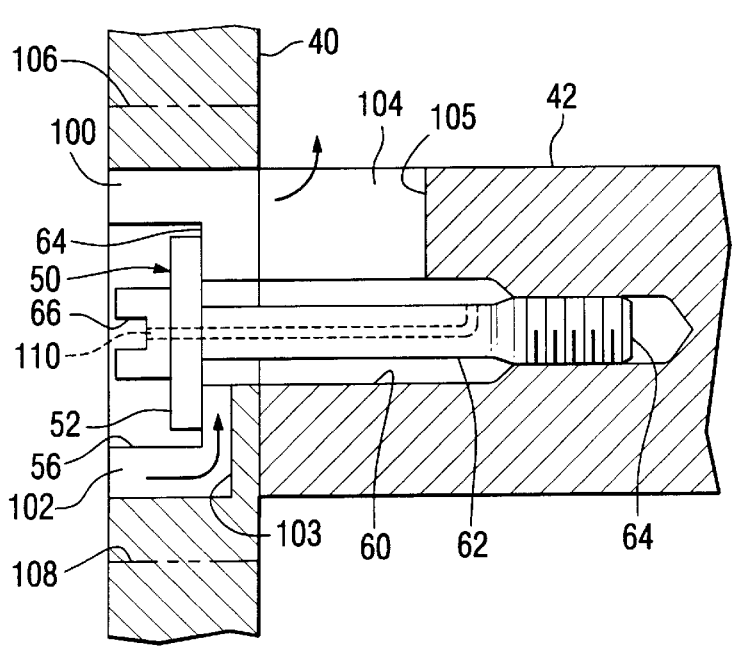
FIG. 9 is a cross section of the baffle/former bolt assembly shown in FIG. 8 taken along Line 9—9.

FIGS. 8–9 illustrate another embodiment of the present invention wherein two spaced apart slots 100–102 are machined into the baffle plate 40 for controlling the flow of primary coolant from one side of the baffle plate 40 to the other. Slot 100 extends to a slot 104 (having a far side 105) machined into the former plate 42 whereas slot 102 is only partially machined through the baffle plate 40 (extending to an interior far side 103). FIGS. 8–9 also illustrate a design modification where, in addition to one or more fluid flow passageways illustrated by FIGS. 2–9, a fluid flow passageway extending internally of the head portion 52 and the shank 62, as shown by phantom hole 110, may be formed through the bolt 52 for communicating between the countersunk hole 56 and the bolt hole 60 in the former plate 42. Advantageously, an internal hole 110 may extend toward the distal end 64 of the bolt for washing the threads. However, and as has been noted above, bolts having internal passageways in their shanks are difficult to ultrasonically inspect and the internal passageways in the shank may affect the strength of the bolt.

FIGS. 8–9 also illustrate an embodiment wherein elongated (above and below the former plates 42) fluid flow passageways, such as phantom slots 106,108, are machined in the baffle plate 40. Advantageously, such a design permits cooling fluid flow from one side of the baffle plate 40 to the other without having to machine or drill holes through the relatively heavier former plates 42. For example, the baffle plates 40 may be on the order of two inches thick whereas the former plates 42 may be on the order of four inches thick. Also, the cross-sectional areas of the slots 106,108 may differ.

Figure 11:
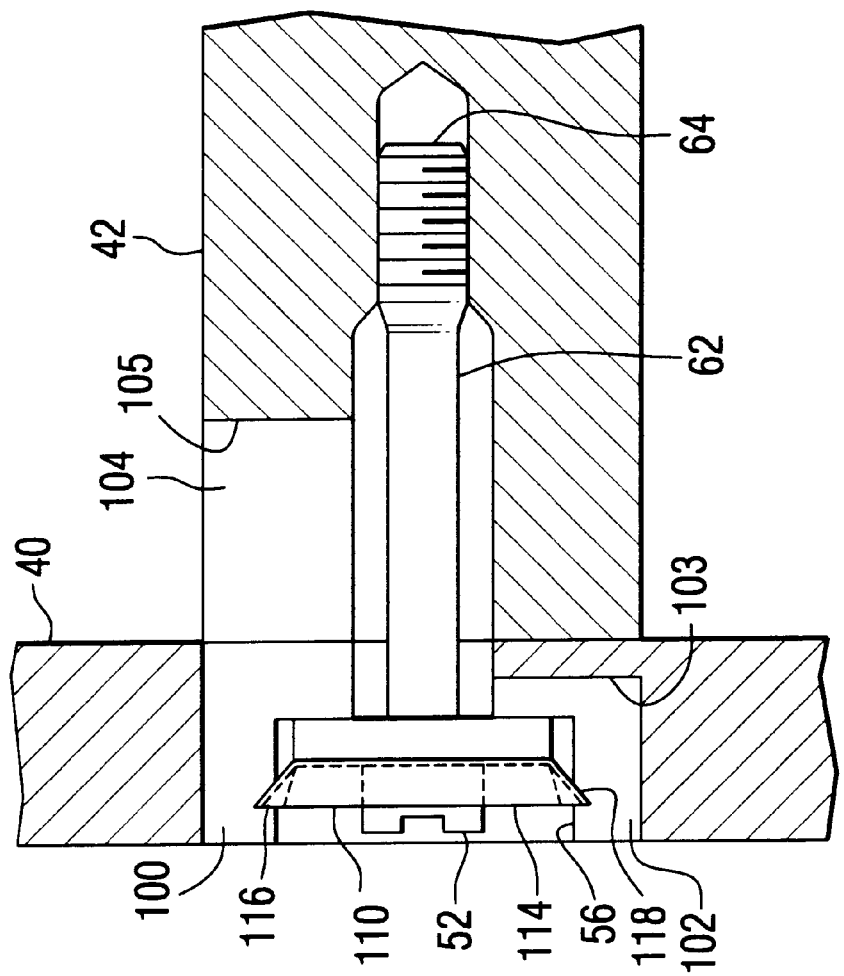
FIG. 11 is a cross section of the baffle/former bolt assembly shown in FIG. 8 taken along Line 11—11.
Figure 10:
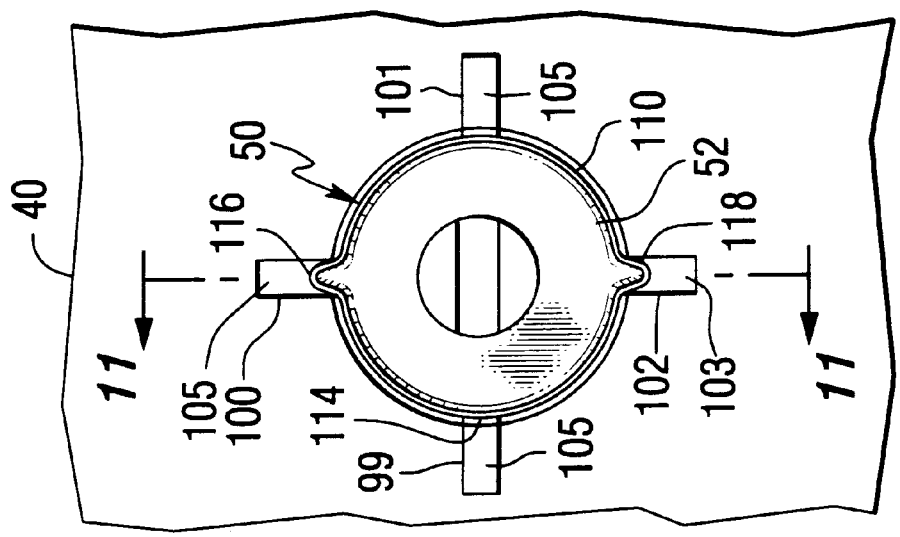
FIG. 10 is a schematic representation of a locking cup integral with a baffle/former bolt.

FIGS. 10 and 11 illustrates a locking cup 110 which may be employed to engage is the slots 99, 100, 101 or 102 in the baffle plate 40 shown in FIG. 8 in order to prevent loosening of the baffle/former bolts 50. As is shown, the locking cup 110 may be a peripheral bowl-shaped extension 114 integral with or welded to the flange on the bolt head portion 52, which may be wedged or otherwise deformed as shown at 116 and 118 to tightly engage fluid flow slots 100 and 102, respectively. In other embodiments, the locking cup 110 may be separate from the bolt head portion 52 in accordance with previously employed locking cup designs. In addition, the locking cup 110 may be crimped into an irregularly shaped feature of the baffle plate. See, e.g., the locking design of U.S. Pat. No. 4,683,108, which is incorporated by this reference.

To backfit a reactor vessel 10, the reactor is taken out of service, the vessel is submerged in a pool, e.g., of refueling water, the top 14 removed, the fuel assemblies 36 removed, and the existing bolts removed. The existing bolts may then be replaced by modified bolts 50 illustrated in FIGS. 2–4 and, if preferred, locked on with a locking cup. In some cases it may be desirable to enlarge the countersunk hole 56 and the bolt holes 58,60 to provide for more cooling or lower flow velocitites. The reactor vessel 10 may then be refueled and restarted. In alternative situations where the fluid flow passageways are formed by machining the baffle plate 40, the baffle plate 40 (and in some cases the former plate 42) may be machined after the existing bolts are removed, the same or similar bolts 50 installed and the reactor vessel 10 is then refueled.

While various present preferred embodiments of the present invention has been shown and described, it is to be understood that the invention may be otherwise variously embodied within the scope of the following claims of invention.

What is claimed is:

1. A nuclear reactor vessel having a baffle-barrel assembly for supporting fuel assemblies in a core region and for guiding fluid flowing through the core region when the reactor vessel is in service, comprising:

a baffle plate defining a countersunk hole having a diameter and a smaller diameter baffle plate bolt hole extending from the countersunk hole, the baffle plate defining a slot extending through the baffle plate and outwardly from both the countersunk hole and the baffle plate bolt hole;

a former plate having opposed surfaces, the former plate defining a bolt hole aligned with the baffle plate bolt hole, the former plate further defining a slot extending from the baffle plate slot and extending outwardly from the former plate bolt hole to at least one of the opposed surfaces; and a bolt for fastening the two plates together, the bolt having a head portion with an undersurface disposed in the countersunk hole and a shank extending from the undersurface of the head portion into the aligned bolt holes, the bolt head defining at least in part a fluid flow passageway external of the shank interconnecting the countersunk hole with the baffle plate bolt hole; and wherein the outwardly extending baffle plate slot extends to at least one of the opposed surfaces of the former plate.

2. The vessel of claim 1, further comprising: a bolt locking clip protruding into the baffle plate slot.

3. The vessel of claim 1, wherein the bolt defines a second fluid flow passageway extending through the head portion and internally through the shank in fluid flow communication with the countersunk hole and the aligned bolt holes.

4. A nuclear reactor vessel having a baffle-barrel assembly for supporting fuel assemblies in a core region and for guiding fluid flowing through the core region when the reactor vessel is in service, comprising:

a baffle plate defining a countersink hole having a diameter and a smaller diameter baffle plate bolt hole extending from the countersunk hole;

a former plate defining a bolt hole aligned with the baffle plate bolt hole; and a bolt for fastening the two plates together, the bolt having a head portion with an undersurface disposed in the countersunk hole and a shank extending from the undersurface of the bead portion into the aligned bolt holes, the bolt head entirely defining a fluid flow passageway external of the shank interconnecting the countersunk hole with the baffle plate bolt hole.

5. A nuclear reactor vessel having a baffle-barrel assembly for supporting fuel assemblies in a core region and for guiding fluid flowing through the core region when the reactor vessel is in service, comprising:

a baffle plate defining a countersunk hole having a diameter and a smaller diameter baffle plate bolt hole extending from the countersunk hole;

a former plate defining a bolt hole aligned with the baffle plate bolt hole;

a bolt fastening the two plates together, the bolt having a head portion with an undersurface disposed in the countersunk hole and a shank extending from the undersurface of the head portion into the aligned bolt holes, the bolt head portion having a slot interconnecting the countersunk hole with the baffle plate bolt hole externally of the shank.

6. The vessel of claim 5, further comprising: a bolt locking cup protruding into the slot.

7. The vessel of claim 5, wherein the bolt defines a fluid flow passageway extending through the head portion and internally through the shank in fluid flow communication with the countersunk hole and the aligned bolt holes.

8. A method of backfitting a nuclear reactor vessel having a baffle plate fastened to a former plate by an existing baffle/former bolt, the bolt having a head portion with an undersurface disposed in a countersunk hole in the baffle plate with a shank extending from the undersurface through aligned holes in the baffle plate and a former plate, the former plate having opposed surfaces, comprising the steps of:

removing the nuclear reactor vessel from service; and then machining a slot extending through the baffle plate and outwardly from both the baffle plate countersink bole and the baffle plate aligned hole and further extending the slot into the aligned former plate outwardly from the aligned former plate hole such that both the slot in the baffle plate and the communicating slot in the former plate extend to at least one of the opposed surfaces of the former plate;

whereby fluid flowing through the reactor vessel when the reactor vessel is in service will wash the undersurface of the bolt head portion.

9. The method of claim 8, including the step of:

crimping a bolt locking cup into the baffle plate slot.

10. The method of claim 13, including the additional step of:

machining a second slot into the baffle plate extending through the baffle plate and outwardly from both the baffle plate countersunk hole and the baffle plate aligned hole, wherein the two slots have different dimensional lengths extending outwardly.

11. The method of claim 8, wherein the former plate slot extends from the aligned bolt hole to both opposed surfaces.

12. A method of backfitting a nuclear reactor vessel having a baffle plate fastened to a former plate by an existing baffle/former bolt, the bolt having a head portion with an undersurface disposed in a countersunk hole in the baffle plate with a shank extending from the undersurface through aligned holes in the baffle plate and a former plate, comprising the steps of:

removing the nuclear reactor vessel from service; and then replacing the existing baffle/former bolt with a baffle/former bolt having a head portion defining a slot external of the shaft interconnecting the countersunk hole and the baffle plate bolt hole;

whereby fluid flowing through the reactor vessel when the reactor vessel is in service will wash the undersurface of the bolt head portion.

13. The method of claim 12, including the step of:

crimping a bolt locking cup into the bolt head slot.

14. A method of backfitting a nuclear reactor vessel having a baffle plate fastened to a former plate by an existing baffle/former bolt, the bolt having a head portion with an undersurface disposed in a countersunk hole in the baffle plate with a shank extending from the undersurface through aligned holes in the baffle plate and a former plate, comprising the steps of:

removing the nuclear reactor vessel from service; and then replacing the existing baffle/former bolt with a baffle/former bolt having a head portion entirely defining a passageway external of the shaft interconnecting the countersunk hole and the baffle plate bolt hole;

whereby fluid flowing through the reactor vessel when the reactor vessel is in service will wash the undersurface of the bolt head portion.

* * * * *